United States Patent
Kang (10) Patent No.: US 8,223,431 B2
(45) Date of Patent: Jul. 17, 2012

(54) REFLECTIVE SCREEN AND MANUFACTURING METHOD THEREOF

(75) Inventor: Hee Bum Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 12/594,063

(22) PCT Filed: Mar. 27, 2008

(86) PCT No.: PCT/KR2008/001702
§ 371 (c)(1),
(2), (4) Date: Sep. 30, 2009

(87) PCT Pub. No.: WO2008/120895
PCT Pub. Date: Oct. 9, 2008

(65) Prior Publication Data
US 2010/0103515 A1   Apr. 29, 2010

(30) Foreign Application Priority Data

Mar. 30, 2007 (KR) .................. 10-2007-0031637
May 31, 2007 (KR) .................. 10-2007-0053261

(51) Int. Cl.
*G03B 21/60* (2006.01)
(52) U.S. Cl. ...................... 359/452; 428/323
(58) Field of Classification Search ............. 359/443, 359/452
See application file for complete search history.

(56) References Cited

U.S. PATENT DOCUMENTS

| | | | |
|---|---|---|---|
| 2,934,997 A * | 5/1960 | Harkness .................. | 359/452 |
| 3,005,790 A * | 10/1961 | Wynn et al. .................. | 523/172 |
| 5,361,163 A | 11/1994 | Matsuda et al. | |
| 6,144,491 A | 11/2000 | Orikasa et al. | |
| 6,404,548 B1 | 6/2002 | Tatsuki et al. | |
| 6,635,306 B2 * | 10/2003 | Steckl et al. .................. | 427/66 |
| 7,180,664 B2 * | 2/2007 | Goto .......................... | 359/456 |
| 7,349,154 B2 * | 3/2008 | Aiura et al. .................. | 359/449 |
| 2004/0240054 A1 | 12/2004 | Aiura et al. | |
| 2005/0041213 A1 | 2/2005 | Paukshto | |
| 2006/0164729 A1 * | 7/2006 | Wood ........................ | 359/619 |

FOREIGN PATENT DOCUMENTS

| | | | |
|---|---|---|---|
| JP | 61122629 A | * | 6/1986 |
| JP | 05-150367 | | 6/1993 |
| JP | 05-297462 | | 11/1993 |
| JP | 06075302 A | * | 3/1994 |
| JP | 06-167746 | | 6/1994 |
| JP | 10282578 A | * | 10/1998 |
| KR | 10282578 | | 10/1998 |
| KR | 10-2007-0012753 | | 1/2007 |
| KR | 10-2007-0012753 A | | 1/2007 |

OTHER PUBLICATIONS

International Search Report dated Aug. 18, 2008.

(Continued)

*Primary Examiner* — Christ Mahoney
*Assistant Examiner* — Leon W Rhodes, Jr.
(74) *Attorney, Agent, or Firm* — KED & Associates LLP (57) ABSTRACT

Provided is a reflective screen. The reflective screen can be widely and commercially used, easily manufactured at low costs, and realize a sufficient reflection image. The reflective screen includes a substrate, a light diffusion layer in front of the substrate, a light reflecting material reflecting projection light, a light absorbing material absorbing external light, and a light absorption reflection layer containing at least the light reflecting material and the light absorbing material together. The light absorption reflection layer being disposed in the rear of the substrate.

19 Claims, 3 Drawing Sheets

OTHER PUBLICATIONS

Chinese Office Action dated Nov. 18, 2010 issued in Application No. 200880017796.4.

Korean Office Action dated Oct. 17, 2011.
European Search Report dated Nov. 14, 2011.

* cited by examiner

REFLECTIVE SCREEN AND MANUFACTURING METHOD THEREOF

TECHNICAL FIELD

The present disclosure relates to a reflective screen reflecting projected light to display an image, and a method for manufacturing the reflective screen.

BACKGROUND ART

A projector can be exemplified as a display device that is increasingly used recently. Advantageously, the projector can easily realize a large-sized screen. The projector operates in the following way, in which light emitted from a light source is synthesized by a light synthesizer to become image light, and this image light is projected onto a screen through a lighting system such as a lens.

Representative examples of a screen displaying an image by the projector include a transmissive screen where an image is projected from the rear of the screen, and a reflective screen reflecting projection light projected from a projector in front of the screen to allow a projection image to be viewed by reflected light.

Representative examples of a related art reflective screen include a bead screen and a white screen reflecting and scattering projected light from a projector. However, since these screens reflects not only projection light from the projector but also external light, the contrast of an image reduces at an atmosphere where an external light level is high, so that a user cannot accurately view a desired image. Therefore, the user should draw a curtain to reduce an external light level to view a projector in an indoor space where the external light level is high. For this limitation, the projector has not been widely distributed for a general household and has required a separate installation space.

To solve this limitation, technology of improving a contrast even when an external light level is higher than a predetermined level by installing a light absorption layer in front of a reflective layer has been proposed. Korean Patent Registration No. 10-0259436 (related art 1) discloses technology in which a light reflection layer is formed on the front side of a substrate, and a light diffusion layer where a pigment allowing light absorption to occur is combined is formed on the front side of the light refection layer.

However, in this case, since not only external light but also projection light from the projector reduces by the light diffusion layer, a white color level falls down, brightness (screen gain) reduces, and contrast enhancement is limited. Particularly, since light incident to the reflection layer and light reflected by the reflection layer are greatly absorbed by the pigment while passing through the light diffusion layer, the above-described limitation becomes serious.

To solve the limitation of the related art 1, Korean Patent Publication No. 10-2006-0045116 (related art 2) discloses a screen having a structure in which a plurality of selective reflection layers and diffusion layers are sequentially stacked on a substrate. Here, the principal technical contents of the selective reflection layer are to allow wavelength regions of three colors of red (R), green (G), blue (B) to be appropriately reflected, thereby improving the quality of a reflection image.

However, according to the technical contents of the related art 2, though an image of high brightness and high contrast of some extent can be obtained under an atmosphere of a high external light level, a plurality of manufacturing processes are required to stack a metal layer, a dielectric layer, and a light absorption thin layer having transmittance on a substrate. Particularly, a sputtering equipment is required to deposit the metal layer and thus manufacturing cost increases. Also, a screen price increases to exceed the cost of a projector, so that there are lots of limitations in commercialization.

DISCLOSURE OF INVENTION

Technical Problem

Embodiments provide a reflective screen that increases the brightness of an image formed on the reflective screen, prevents reduction in contrast, and increases a viewing angle, thereby enhancing even more the quality of the image formed on the screen, and a method for manufacturing the reflective screen.

Embodiments also provide a reflective screen that can be applied to a mass production commercially at a cheap price using a simple manufacturing method as well as achieving high quality, and a method for manufacturing the reflective screen.

Technical Solution

In one embodiment, a reflective screen includes: a substrate; a light diffusion layer in front of the substrate; a light reflecting material reflecting projection light; a light absorbing material absorbing external light; and a light absorption reflection layer containing at least the light reflecting material and the light absorbing material together, the light absorption reflection layer being disposed in the rear of the substrate.

The light absorbing material may be a gray or dark gray pigment, and the light reflecting material may be at least one selected from the group consisting of a pearl particle, silver powder, and aluminum powder. The substrate may be formed of one material selected from the group consisting of polyvinyl chloride (PVC), polyethylene terephthalate (PET), acryl, and polyester having a light transmitting characteristic. The light absorption reflection layer may be formed by spreading. The light diffusion layer may be one of a light diffusion film using a film where a light diffusion agent has been dispersed in a film substrate formed of a light transmissive resin, a light diffusion film where unevenness has been directly disposed on a surface of a film substrate formed of a light transmissive resin, and a light diffusion film where a composite formed by combining and dispersing a light diffusion agent in a light transmissive resin is spread on a surface of a film substrate to form a light diffusion layer.

The light diffusion layer may include a plurality of light diffusion layers overlapping each other. Another substrate may be interposed between the overlapping light diffusion layers.

The light diffusion layer can be realized by fine unevenness formed in a surface of the substrate.

A protective layer may be further disposed in front of the light diffusion layer. The light diffusion layer and the protective layer may be realized together by an anti-glare (AG) hard coating layer.

A black film may be further disposed in the rear of the light absorption reflection layer.

In another embodiment, a reflective screen reflecting projection light from a projector includes: a substrate; and a light absorption refection layer on one side of the substrate, the light absorption reflection layer including a light absorbing material absorbing light and a light reflecting material reflecting light distributed together in the same layer.

The light absorption reflection layer may be disposed in the rear of the substrate or may be disposed in front of the substrate with respect to the projection light. In the case where the light absorption reflection layer is disposed in the rear of the substrate, the light diffusion layer may be disposed in front of the substrate, and the light diffusion layer may be a diffusion film for a liquid crystal display device. In the case where the light absorption reflection layer is disposed in front of the substrate, the light absorption reflection layer may contain a light diffusing material, and a protective layer and/or a diffusion layer may be further disposed in front of the light absorption reflection layer.

In further another embodiment, a method for manufacturing a reflective screen reflecting projection light from a projector includes: manufacturing coating liquid combining at least a light absorbing material absorbing light and a light reflecting material reflecting light; and coating the coating liquid on one side of a substrate and drying the spreading liquid to form a light absorption reflection layer.

The coating liquid may be spread using a dip coating or a spray method. The coating liquid may be spread in the rear or in front of the substrate with respect to the projection light. In the case where the coating liquid is spread in the rear of the substrate, the method may further include forming a light diffusion layer in front of the substrate, and the forming of the light diffusion layer may be performed at least one time. The method may further include forming a black film in the rear of the light absorption reflection layer after the forming of the light absorption reflection layer. In the case where the coating liquid is spread in front of the substrate, the method may further include forming a light diffusion layer in front of the light absorption reflection layer.

The spreading of the coating liquid may be performed at least one time.

ADVANTAGEOUS EFFECTS

According to an embodiment, a screen where reduction in brightness of projection light is small and the contrast of an image improves even when external light influences can be obtained. Also, a manufacturing cost of a screen reduces.

BEST MODE FOR CARRYING OUT THE INVENTION

Reference will now be made in detail to the embodiments of the present disclosure with reference to the accompanying drawings.

Figure 1:
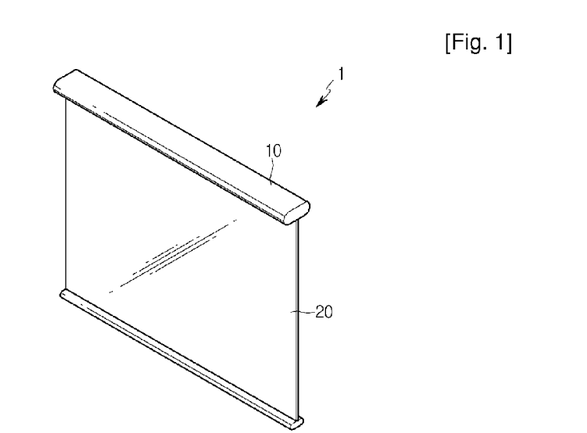
FIGS. 1 and 2 are views illustrating a screen apparatus to which a reflective screen according to an embodiment is applied.
Figure 2:
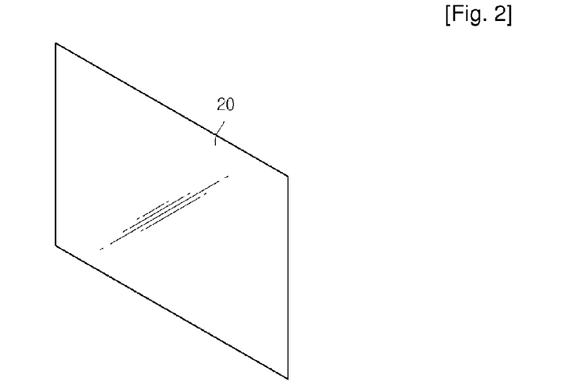

FIGS. 1 and 2 are views illustrating a screen apparatus to which a reflective screen according to an embodiment is applied.

The screen apparatus 1 illustrated in FIG. 1 includes a reflective screen 20 reflecting an image projected onto a front surface of the reflective screen 20 to display the image, and a fixing unit 10 fixing the reflective screen 20. Here, the reflective screen 20 is formed of a material having flexibility of some degree. The reflective screen 20 is inserted in the fixing unit 10 while it is not in use, and drawn while it is in use. The screen apparatus illustrated in FIG. 2 illustrates the reflective screen 20 fixed on a wall surface, and is different from the screen apparatus of FIG. 1 in that it is fixed on the wall surface.

The structure of the reflective screen and a method for manufacturing the reflective screen are described below in detail. The reflective screen according to the present disclosure provides various modified embodiments which fall within the same spirit. Descriptions will be sequentially made below.

Embodiment 1

Figure 3:
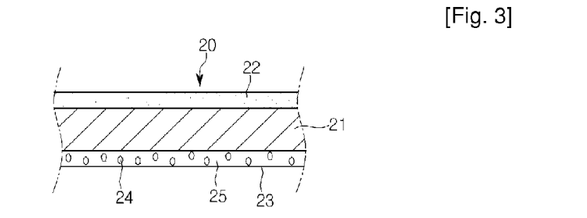
FIG. 3 is a cross-sectional view of a reflective screen according to an embodiment.

FIG. 3 is a cross-sectional view of a reflective screen according to an embodiment.

Referring to FIG. 3, the reflective screen includes a substrate 21, a light absorption reflection layer 23 formed on the rear side of the substrate 21, and a light diffusion layer 22 formed on the front side of the substrate 21. In the drawing, an arrow indicates the incident direction of projection light of a projector.

The above-mentioned elements are described below in more detail.

Substrate 21

The substrate 21 has a sufficient area on which light projected from the projector is displayed, and is formed of a transparent material. The substrate 21 can be formed of polyvinyl chloride (PVC), polyethylene terephthalate (PET), polycarbonate (PC), acryl, and polyester which have light transmission degree of 90% or more. Here, a material such as PET having low flexibility may be applied to the screen fixed on the wall surface illustrated in FIG. 2.

Light Absorption Reflection Layer 23

The light absorption reflection layer 23 basically includes pigment 25 and a reflecting material 24, and preferably includes a compound including the pigment 25, the reflecting material 24, and a brightener. Also, the light absorption reflection layer 23 can further includes various kinds of additives. The light absorption reflection layer 23 is formed by coating liquid on the rear side of the substrate 21 in a liquid state where pigment, a reflecting material, and a brightener are combined at a predetermined ratio in advance before the light absorption reflection layer 23 is coated on the substrate 21.

As an example, the coating liquid forming the light absorption reflection layer 23 can include a synthetic resin of 15-17 weight %, toluene of 20-25 weight %, ethyl acetate of 10-15 weight %, methyl isobutylketone of 10-23 weight %, cellosolve acetate of 10-15 weight % as base materials, and include a reflecting material of 1-7 weight % and pigment of 10-13 weight %. Here, after manufacturing the reflective screen is completed, a solvent such as toluene volatilizes after coating is performed, so that the light absorption reflection layer 23 includes the reflecting material and the pigment distributed in the synthetic resin of a film state.

At this point, the pigment 25 may be gray or dark gray based color. The pigment may be set such that brightness of 6 cd/m$^2$ or less is measured under a surrounding intensity of illumination of 200 Lux when the pigment is coated on the substrate 21 together with the reflection material and the brightener. This dark pigment 25 changes the projection surface of the screen into gray or dark gray color to make a screen surface itself dark, and thus allows black color to be expressed on the projection surface. Also, this dark projection surface provides an optical characteristic of maximizing the contrast of an image using the reflecting material 24 coated together with the pigment 25 of dark color, and allows an image projected on the projection surface to be viewed more clearly.

In the embodiment, the light absorption reflection layer 23 is coated on the rear side of the substrate 21. Therefore, a coating process of the light absorption reflection layer 23 is performed on only the rear side of the substrate 21. Therefore, even when the coating liquid is sprayed on the rear side of the substrate 21 using any method, for example, a spray method, the surface of the light absorption reflection layer 23 contacting the substrate 21, that is, a reflection plane of projection light maintains a flat state like the substrate 21, so that stain generation within a wide range of the reflective screen is prevented. In other words, even when the light absorption reflection layer 23 is locally spread thin and thus a height difference of the light absorption reflection layer 23 is generated over the entire range of the screen, the plane contacting the substrate 21 is flat on the whole, so that the reflection angle of reflected light is maintained constant on the whole to prevent stain from being generated to the reflected light.

In the case where the light absorption reflection layer 23 including the gray or dark gray pigment, the reflecting material, and the brightener is coated on the rear side of the substrate 21 as described above, light coming from the neighborhood of the screen is mostly absorbed by the dark color based pigment 25, and light emitted from a projector light source is reflected to a viewer through the transparent substrate 21 by the reflecting material 24, so that more clear image quality is provided. This is because projection light from the projector being incident from the front direction, is effectively reflected directly to the viewer, and external light incident from side directions is mostly absorbed by the pigment 25 while the light is reflected to the side directions by the reflecting material 24. Such an operation considerably occurs in the case where the reflecting material 24 is vertically disposed in the light absorption reflection layer 23.

Also, in case of a related art screen, it is difficult to control light coming from the rear and light emitted from the projector partially passes through the screen, so that image quality decreases due to low light efficiency. To solve this limitation, a black film should be separately formed on the rear side of the screen. On the other hand, since the present embodiment uses the dark color based pigment, light from the rear does not have an influence on an image. Accordingly, a separate black film does not need to be formed on the rear side of the screen. Of course, since the present embodiment does not exclude forming the black film, the black film can be additionally formed on the rear side of a screen film, that is, the rear side of the light absorption reflection layer. However, in case of the present embodiment, the necessity of the black film is low because the light absorption reflection layer is present.

The light absorption reflection layer 23 can be spread on the rear side of the substrate 21 using dip coating and spring coating. Though a coating method is not particularly limited, the spraying coating may be selected in an aspect of convenience in manufacturing.

Meanwhile, a pearl particle, silver powder, and aluminum powder can be used for the reflecting material 24. Most preferably, a pearl particle is used for the reflecting material 24. The reflecting material reflects light projected onto the substrate so that a user located in the front direction can view the light.

Light Diffusion Layer 22

The light diffusion layer 22 is designed for obtaining a light diffusing operation of widening the viewing angle of light reflected by the screen 20. The light diffusion layer can be one of a light diffusion film using a film where a light diffusion agent has been dispersed on a film substrate formed of a light transmissive resin, a light diffusion film where unevenness has been directly formed on a surface of a film substrate formed of a light transmissive resin, and a light diffusion film where a composite formed by combining and dispersing a light diffusion agent in a light transmissive resin is spread on a surface of a film substrate to form a light diffusion layer.

The light diffusion layer 22 can prevent the glaring of a user. In this aspect, the light diffusion layer 22 can be an anti-glare (AG) coating layer or an anti-reflective (AR) coating layer.

The operation of the reflective screen according to an embodiment is described.

Projection light from the projector including an image passes through the light diffusion layer 22, passes through the transparent substrate 21, and then is reflected by the light absorption reflection layer 23. The light reflected by the reflecting material 24 of the light absorption reflection layer 23 passes through the substrate 21, and then diffuses through the light diffusion layer 22 to secure a wide viewing angle. At this point, external light having nothing to do with the projection light from the projector is mostly absorbed by the pigment 25, so that contrast can be enhanced even without reduction in brightness.

Meanwhile, unlike the related art 1 described above, light is not substantially absorbed in the light diffusion layer 22 according to the present embodiment, so that loss in projection light of the projector is almost not generated. In detail, since the light diffusion layer contains a predetermined amount of pigment according to the related art 1, light incident to the light diffusion layer is mostly absorbed by the pigment and even the projection light of the projector is absorbed together with the external light, so that much light loss is generated. On the other hand, since the light diffusion layer 22 transmits incident light according to the present embodiment, loss in the projection light of the projector is not substantially generated.

Of course, loss in the projection light can be generated by the pigment 25 while the projection light is reflected within the thickness range of the light absorption reflection layer 23, but such a loss is considerably small compared to the loss of the related art 1. Therefore, a high gain can be obtained with respect to the projection light of the projector.

Also, unlike the related art 2, since the reflective screen can be manufactured using a simple process of spreading the coating liquid in a liquid state on the rear side of the substrate 21 and drying the same to form the light absorption reflection layer 23 according to the present embodiment, high satisfaction can be obtained in aspects of manufacturing costs and selling price.

Also, since the light absorption reflection layer 23 is provided on the rear side of the substrate 21, even when the light absorption reflection layer 23 is formed using any method, for example, a spray method and a height difference in the light absorption reflection layer 23 is generated, a plane (which contacts the rear side of the substrate) contacting the substrate 21 is flat on the whole, so that it is expected that stains that may be partially generated over a wide range of the reflective screen in the case where the light absorption reflection layer 23 is formed on the front side of the substrate 21, can be prevented.

Meanwhile, a protective layer for preventing scratches can be formed together with or separately from the light diffusion layer 22. For example, in the case where an AG coating layer is used as the light diffusion layer 22, an AG hard coating layer simultaneously realizing an AG coating layer and a hard coating can be formed. The AG hard coating layer can be formed by adding a photoinitiator, a filler of 1-5 micrometer, and a co-link agent to manufacture an AG hard coating agent, and then coating the same. The coated AG hard coating agent can be cured using an ultra violet (UV) lamp in a region of 350 nm of an UV region between 200 nm and 400 nm. The AG hard coating agent may represent scattering transmission degree of about 50-65% when measured by a haze meter.

In the reflective screen according to the present embodiment, only the light absorption reflection layer 23 including dark color based pigment and a predetermined reflecting material is exemplarily coated on the rear side of the substrate 21, the reflective screen is not limited thereto. For example, a black film can be additionally provided to the rear side of the screen film, that is, the rear side of the light absorption reflection layer.

Figure 4:
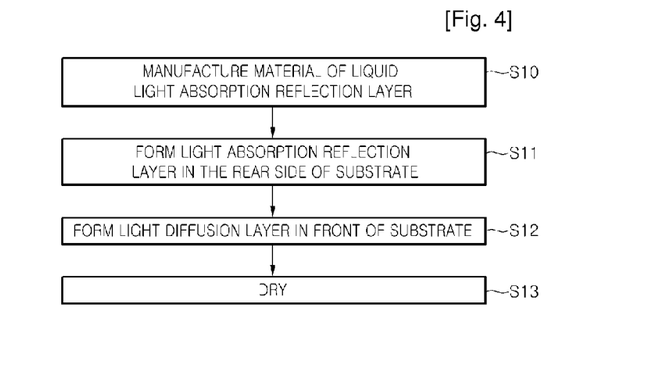
FIG. 4 is a flowchart explaining a method for manufacturing a reflective screen according to an embodiment.

FIG. 4 is a flowchart explaining a method for manufacturing a reflective screen according to an embodiment.

Referring to FIG. 4, the pigment, the reflecting material, and the brightener are combined at a predetermined ratio to manufacture the material, i.e., the coating liquid of the light absorption reflection layer (S10). At this point, the combination ratio of the pigment, the reflecting material, and the brightener can change depending on a desired specification, and particularly, the color of the pigment is selected from gray or dark gray based colors. Also, the reflecting material can be selected from a pearl particle, silver powder, and aluminum powder. Preferably, the pearl particle is used.

Next, the manufactured liquid light absorption reflection layer is spread on the rear side of the prepared substrate 21 (S11). At this point, the coating operation S11 is performed using dip coating or a spray method. In the case where the spray method is used, the coating operation can be performed by spraying the liquid light absorption reflection layer on the rear side of the substrate 21 only one time, or can be performed several times in order to make the light absorption reflection layer 23 thick. Also, since the coating liquid as the liquid light absorption reflection layer is manufactured first, the combination ratio of the composite materials can be easily controlled.

Here, the coating operation S11 can be performed using dip coating or a spray method. Here, in the case where the liquid light absorption reflection layer is coated using the spray method, the sprayed coating liquid can be uniformly spread and coated, so that the brightness and contrast of the screen easily controlled and changed depending on the combination of the pigment. Also, since the reflecting material such as a pearl particle and the pigment do not stick to each other due to the characteristic of the spray method, the reflecting material is vertically arranged on the projection surface of the screen to effectively reflect light projected on the front side to a viewer. Also, the spray method prevents the liquid light absorption reflection layer from flowing down on the screen surface, so that stains are not generated on the screen surface, and processing costs required for the coating operation can be reduced and thus more effective.

After the coating operation S11 is performed, the light diffusion layer 22 is formed on the front side of the substrate 21 (S12). When the light diffusion layer 22 is dried, the screen according to the present embodiment is completed (S13).

According to the present embodiment, the contrast of an image improves without reduction in brightness of projection light even when there exists influence of external light, so that it is expected that quality of an image reflected by the reflective screen improves.

Also, since the screen can be simply manufactured using a simple and cheap spreading process such as a spray method, and a contact surface between the rear side of the substrate and the light absorption reflection layer can maintain a uniform state even when the coating process is not uniformly performed, deterioration in image quality is prevented.

Also, since a light absorption layer and a light reflection layer are formed together, a manufacturing process is simpler. Since a light absorption function and a light reflection function are realized together by a single layer, the light absorption reflection layer has a remarkable difference in aspects of increased manufacturing costs and complicated manufacturing process compared to a structure in which the light absorption layer and the light reflection layer are individually and finely stacked as disclosed in the related art. Also, according to a structure in which the light absorption layer and the light reflection layer are individually stacked, for example, the light absorption layer is disposed in the front and the light reflection layer is formed as a separate layer in the rear with respect to projection light, light incident to the light absorption layer is mostly absorbed in the light absorption layer, so that gain decreases. On the other hand, in the case where the light reflection layer is disposed in the front and the light absorption layer is disposed in the rear with respect to projection light, light cannot substantially pass through the light reflection layer, so that almost no light can reach the light absorption layer and thus the unique role of the light absorption layer cannot be performed.

A modified example of a method for manufacturing the reflective screen according to an embodiment is described. In the case where the light diffusion layer 22 is not by AG/AR coating, the operation S12 of forming the light diffusion layer can be omitted. Furthermore, the operation S12 of forming the light diffusion layer can be changed in its sequence by the operation S10 of manufacturing the light absorption reflection layer. For example, a process of attaching the light diffusion film on the front side of the substrate can be performed at any operation.

To experiment the performance of the reflective screen according to the present embodiment, the contrast of the completed screen has been measured, and compared with those of related art white screen and liquid crystal display (LCD) monitor as illustrated in Table 1 below.

In the experiment, surrounding intensity of illumination has been set to 200 lux and 1000 Ansi Lumen has been used as the related art white screen.

TABLE 1

|  | General screen | LCD monitor | Light control screen |
|---|---|---|---|
| Black | 21 cd/m2 | 1.7 cd/m2 | 4.9 cd/m2 |
| White | 125 cd/m2 | 110 cd/m2 | 170 cd/m2 |
| Contrast ratio | 5.9:1 | 64.7:1 | 34.6:1 |

Also, to check the optical characteristic of the reflective screen according to the present embodiment, light having intensity of illumination of 138 lux has been introduced from the lateral side of the screen and an image has been projected using the same white projector. With these conditions, the contrast of the screen has been measured as illustrated in Table 2.

TABLE 2

|  | General screen | LCD monitor | Light control screen |
|---|---|---|---|
| Black | 14.1 cd/m2 | 0.29 cd/m2 | 1.8 cd/m2 |
| White | 116 cd/m2 | 110 cd/m2 | 165 cd/m2 |
| Contrast ratio | 8.2:1 | 379:1 | 91:1 |

According to the above experiment results, the reflective screen of the present embodiment does not reach the performance of the LCD monitor but shows six times to ten times greater contrast ratio than that of the related art white screen. Therefore, the reflective screen of the present embodiment has excellent performance compared to the related art screen.

Figure 5:
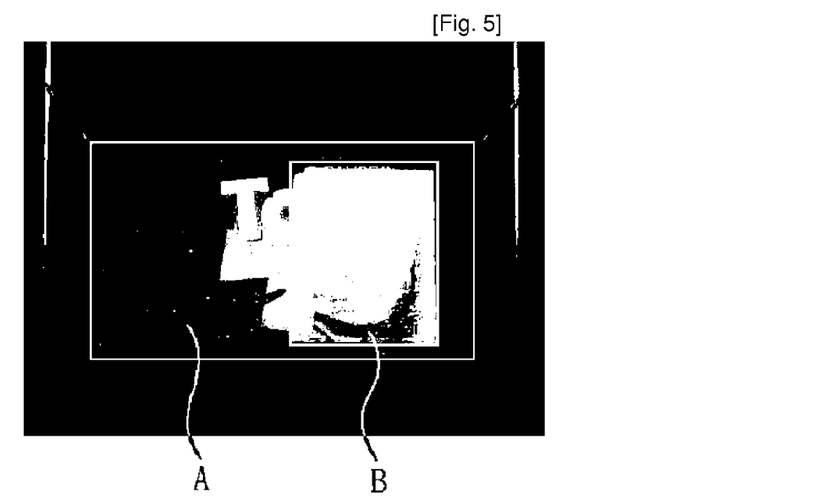
FIG. 5 is a photo comparing an image reflected by a reflective screen according to an embodiment with an image of a related art white screen.

FIG. 5 is a photo comparing an image reflected by a reflective screen according to an embodiment with an image of a related art white screen. Referring to FIG. 5, a region A of the screen according to the present embodiment expresses black color more clearly and shows higher contrast than a region B of the related art white screen.

Embodiment 2

Other parts of another embodiment are the same as those of the previous embodiment, and only difference is the construction of the light diffusion layer. Accordingly, descriptions of the same parts are omitted.

Figure 6:
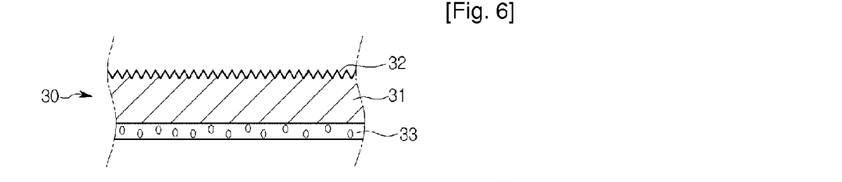
FIG. 6 is a cross-sectional view of a reflective screen according to another embodiment.
Figure 7:
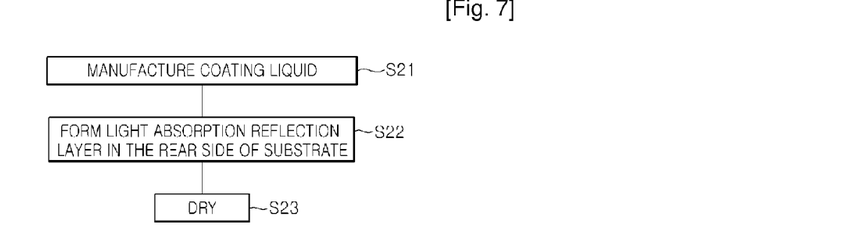
FIG. 7 is a flowchart explaining a method for manufacturing a reflective screen according to another embodiment.

FIG. 6 is a cross-sectional view of a reflective screen according to another embodiment, and FIG. 7 is a flowchart explaining a method for manufacturing a reflective screen according to another embodiment.

Referring to FIG. 6, the reflective screen 30 includes a substrate 31, a light absorption reflection layer 33 formed on the rear side of the substrate 31, and an unevenness portion 32 formed on the front side of the substrate 31. The unevenness portion 32 can serve as a light diffusion layer.

The unevenness portion 32 has so fine unevenness patterns as to generate a light diffusion operation. The substrate 31 on which the unevenness portion 32 is provided can be manufactured in the following process.

The substrate 31 can be manufactured in a method including a process of spreading an ionization radiation-curable resin in a fluid state on the surface of a roll plate in which fine unevenness patterns are formed, and simultaneously winding a transparent substrate around the roll plate to allow the transparent substrate to contact the ionization radiation-curable resin and rotating the roll plate, a process of closely attaching the ionization radiation-curable resin to the transparent substrate to cure the resin while the roll plate rotates, and a process of stripping off the transparent substrate together with the cured resin from the roll plate.

In the case where the substrate 31 on which the unevenness portion 32 has been formed is used, a light diffusion function is already realized by the unevenness portion 32. Therefore, as proposed by a manufacturing method of FIG. 7, coating liquid forming a light absorption reflection layer is manufactured (S21), the coating liquid is spread on the rear side of a substrate to form the light absorption reflection layer 33 (S22), and the light absorption reflection layer 33 is dried (S23), so that the manufacturing process of the screen is completed.

According to the present embodiment, it is expected that the manufacturing process of the reflective screen is simplified even more and manufacturing costs thereof reduces even more.

Embodiment 3

Since still another embodiment is mostly the same as the previous embodiments, only different parts are described in detail and description of the same parts are omitted.

Figure 8:
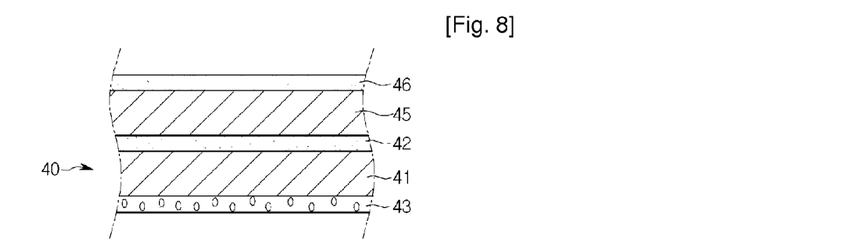
FIG. 8 is a cross-sectional view of a reflective screen according to still another embodiment.

FIG. 8 is a cross-sectional view of a reflective screen according to still another embodiment.

Referring to FIG. 8, the reflective screen 40 includes a second substrate 41, a light absorption reflection layer 43 formed on the rear side of the second substrate 41, a second light diffusion layer 42 formed on the front side of the second substrate 41, a first substrate 45 formed on the front side of the second light diffusion layer 42, and a first light diffusion layer 46 formed on the first substrate 45.

As apparent from the drawing, the light diffusion layers are repeatedly formed in the present embodiment. In the case where the light diffusion layers 42 and 46 are repeatedly formed, light diffusion is enhanced. Therefore, the contrast of an image reduces due to brightness increase of external light at a position of a large viewing angle by diffusion of external light but a phenomenon of local glaring on the screen disappears, so that an image become smooth on the whole.

Embodiment 4

Since still another embodiment is mostly the same as the previous embodiments, description of the same parts are omitted and only different parts are described in detail.

Figure 9:
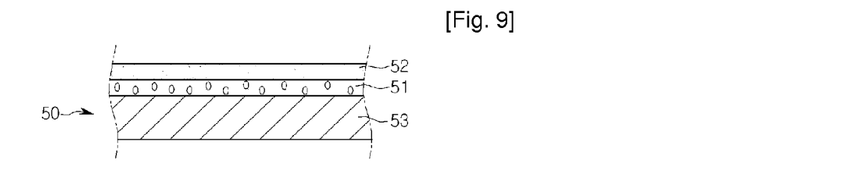
FIG. 9 is a cross-sectional view of a reflective screen according to still another embodiment.

FIG. 9 is a cross-sectional view of a reflective screen according to still another embodiment.

Referring to FIG. 9, the reflective screen 50 includes a substrate 53, a light absorption reflection layer 51 formed on the front side of the substrate 53, and a light diffusion layer 52 formed on the front side of the light absorption reflection layer 51. Here, though the substrate 53 is not limited to a transparent substrate or an opaque substrate, the substrate 53 may be an opaque substrate in preparation for the case where reflection/absorption performance by the light absorption reflection layer 51 is not effective.

According to the present embodiment, projection light of a projector passing through the light diffusion layer 52 passes through one time of diffusion, and light reflected by the light absorption reflection layer 51 diffuses again at the light diffusion layer 52. Therefore, same advantages that can be obtained by the previous embodiments can be achieved. In other words, brightness and contrast are enhanced in comparison with the related art light diffusion layer 52 where light absorption materials are distributed.

Here, a general method for forming a light diffusion layer can be likewise applied to the light diffusion layer. The light diffusion layer may not be provided depending on cases. For example, a case where the light diffusion layer is not provided can be applied to a small-sized screen considering that diffusion is not effective. Also, the light diffusion layer can be realized by adding predetermined materials, i.e., light diffusion materials providing a diffusion effect to a liquid light absorption reflection layer, but such a method is not preferable because the manufacturing method is difficult. However, when technology develops in the future, such a method can be realized.

Figure 11:
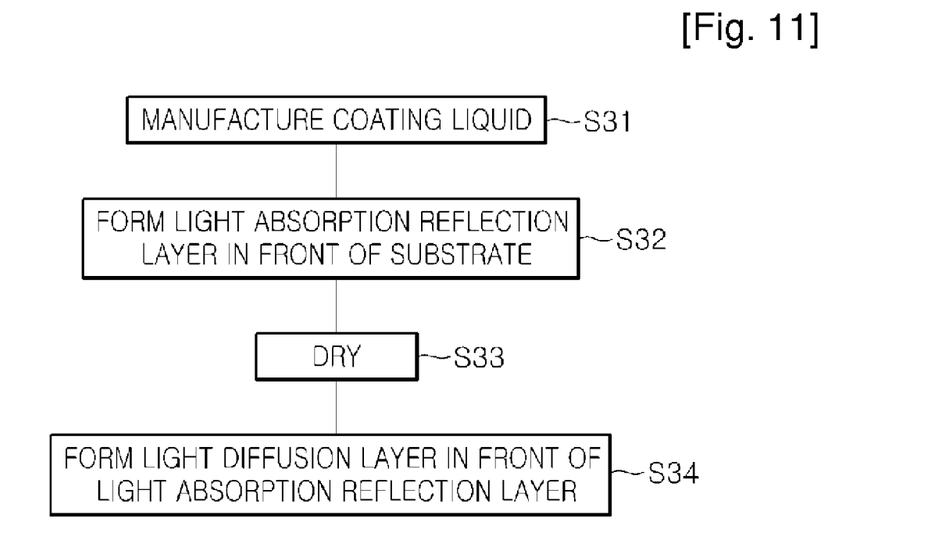
FIG. 11 is a flowchart explaining a method for manufacturing a reflective screen according to still another embodiment.

FIG. 11 is a flowchart explaining a method for manufacturing a reflective screen according to still another embodiment.

Referring to FIG. 11, coating liquid forming a liquid light absorption reflection layer is manufactured (S31), the manufactured coating liquid is spread on the front side of a substrate (S32), and dried (S33), and then a light diffusion layer is formed on the front side of the light absorption reflection layer (S34). Of course, in the case where the light diffusion layer is not present, the entire process can be completed after the drying process (S33) is performed.

The reflective screen can be realized using the above-described simple process.

Also, as a modification of the present embodiment, a protective film can be further provided as a protective layer on the front side of the reflective screen. The protective film can be manufactured using a transparent PET, acryl, PC sheet, and attached preferably with a thickness of 0.02-0.3 mm. The protective film prevents the light absorption reflection layer 51, particularly, the reflecting materials 24 from being damaged by contact with the outside or impact from the outside. In the case where the light diffusion layer 52 is provided, the protective film may not be separately required.

Embodiment 5

Since still another embodiment is mostly the same as the previous embodiments, descriptions of the same parts are omitted and only different parts are described.

Figure 10:
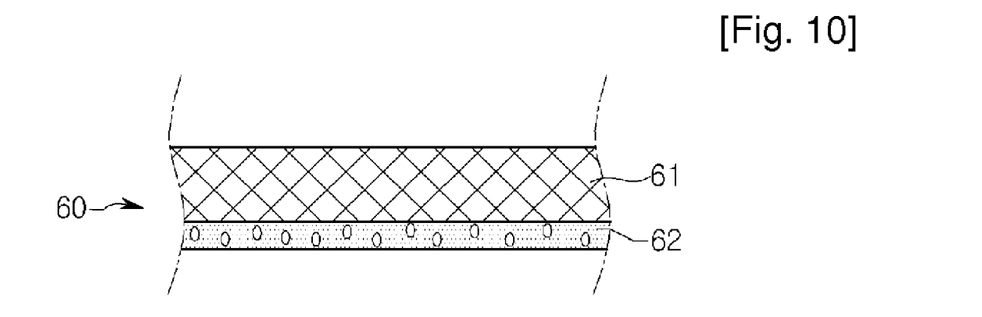
FIG. 10 is cross-sectional view of a reflective screen according to still another embodiment.

FIG. 10 is a cross-sectional view of a reflective screen according to still another embodiment.

Referring to FIG. 10, the reflective screen 60 includes a diffusion film 61 for an LCD device, and a light absorption reflection layer 62 formed on the rear side of the diffusion film 61.

For the diffusion film 61 for the LCD device, the light diffusion layer described in the previous embodiments can be formed in a predetermined structure or a diffusion film having a predetermined thickness can be used. Any film widely used for light diffusion in an LCD device can be used.

Also, in case of the present embodiment, any reinforcement layer for reinforcing strength can be further formed on the rear side of the light absorption reflection layer 62 to reinforce strength of the reflective screen itself.

According to the present embodiment, since the diffusion function of the diffusion film for the LCD device widely used in a current industry of a display device can be directly used, cheaper reflective screen can be manufactured using the advantage of a low price by mass production.

MODE FOR THE INVENTION

In one of the previous embodiments, dye can be used as pigment absorbing light. This material is generally called a light absorbing material.

The spirit of the present disclosure can further include other embodiments. For example, the above-described various embodiments can provide another embodiment by applying a characteristic of one embodiment to another embodiment. By this embodiment, an effect of one embodiment can be combined with an effect of another embodiment to obtain a new effect, which also falls within the spirit of the present disclosure.

INDUSTRIAL APPLICABILITY

Since the reflective screen can be easily manufactured using a simple manufacturing method, it can be widely and commercially used. In other words, since the reflective screen can be easily manufactured at low costs in comparison with a related art screen of a considerable price and can realize a sufficient reflective image, it can be widely used for a general household. Therefore, the projector can be widely distributed for household use.

The invention claimed is:

1. A reflective screen comprising:
   a substrate;
   a light diffusion layer in front of the substrate; and
   a light absorption reflection layer coupled to a rear of the substrate,
   wherein a plurality of spaced particles of a light reflecting material and a light absorbing material are located together within a same layer of the light absorption reflection layer and wherein the plurality of spaced particles of the light reflecting material are arranged to be interspersed in a substantially continuous manner throughout light absorption reflection layer, each particle reflecting light in at least one predetermined direction.

2. The reflective screen according to claim 1, wherein the light absorbing material comprises a gray or dark gray pigment, and the light reflecting material comprises at least one selected from the group consisting of a pearl particle, silver powder, and aluminum powder.

3. The reflective screen according to claim 1, wherein the substrate is formed of one material selected from the group consisting of polyvinyl chloride, polyethylene terephthalate, acryl, and polyester having a light transmitting characteristic.

4. The reflective screen according to claim 1, wherein the light absorption reflection layer is formed by spreading.

5. The reflective screen according to claim 1, wherein the light diffusion layer comprises one of:
   a light diffusion film using a film where a light diffusion agent has been dispersed in a film substrate formed of a light transmissive resin,
   a light diffusion film where unevenness has been directly formed in a surface of a film substrate formed of a light transmissive resin, or
   a light diffusion film where a composite formed by combining and dispersing a light diffusion agent in a light transmissive resin is spread on a surface of a film substrate to form a light diffusion layer.

6. The reflective screen according to claim 1, wherein the light diffusion layer comprises a plurality of light diffusion layers overlapping each other.

7. The reflective screen according to claim 6, wherein another substrate is interposed between the overlapping light diffusion layers.

8. The reflective screen according to claim 1, wherein the light diffusion layer comprises fine unevenness formed in a surface of the substrate.

9. The reflective screen according to claim 1, wherein a protective layer is further disposed in front of the light diffusion layer.

10. The reflective screen according to claim 1, wherein a black film is further formed in the rear of the light absorption reflection layer.

11. The reflective screen according to claim 1, wherein:
    light absorbing material has a predetermined pigment.

12. The reflective screen according to claim 11, wherein the predetermined pigment is gray and wherein the light absorbing material absorbs light on the screen at any incident angle.

13. The reflecting screen according to claim 1, wherein each particle:
- reflects light incident on the screen at a first angle which is perpendicular to the screen, the light reflected from the screen at substantially the first angle or another angle, and
- reflects light incident on the screen at a second angle different from the first angle,
- wherein the second angle is an acute angle relative to the screen and wherein the light received on the screen at the acute angle is reflected by each particle at a same or another acute angle.

14. A method for manufacturing a reflective screen reflecting projection light from a projector, the method comprising:
- forming a light diffusion layer on a front surface of the substrate;
- spreading a coating liquid on a rear surface of the substrate, the coating liquid including a light absorbing material and a plurality of spaced particles of light reflecting material; and
- drying the spread coating liquid to form a light absorption reflection layer, wherein the plurality of spaced particles of the light reflecting material are arranged to be interspersed in a substantially continuous manner throughout the light absorbing material, each particle to reflect light in at least one predetermined direction.

15. The method according to claim 14, wherein the coating liquid is spread using a dip one of coating or a spray method.

16. The method according to claim 14, further comprising forming a black film in the rear of the light absorption reflection layer after forming of the light absorption reflection layer.

17. The method according to claim 14, wherein the spreading of the coating liquid is performed at least one time.

18. The method according to claim 14, wherein the coating liquid is spread in front of the substrate with respect to the projection light.

19. The method according to claim 18, further comprising forming a light diffusion layer in front of the light absorption reflection layer.

* * * * *